United States Patent
Arneson et al.

(10) Patent No.: US 8,049,747 B2
(45) Date of Patent: Nov. 1, 2011

(54) LIGHT DIFFUSER FOR A STRETCHABLE DISPLAY

(75) Inventors: Theodore Arneson, Ivanhoe, IL (US); Zhiming Zhuang, Kildeer, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 766 days.

(21) Appl. No.: 11/956,613

(22) Filed: Dec. 14, 2007

(65) Prior Publication Data
US 2009/0153542 A1 Jun. 18, 2009

(51) Int. Cl.
*G06F 3/038* (2006.01)
(52) U.S. Cl. .................. 345/214; 349/60; 361/679.26
(58) Field of Classification Search ............ 345/4, 214; 349/60, 64, 112, 150, 162; 361/679.26, 679.27, 361/679.28, 679.3; 438/27, 28, 29; 40/603; 359/707; 455/575.3; 715/788
See application file for complete search history.

(56) References Cited

U.S. PATENT DOCUMENTS

| | | |
|---|---|---|
| 5,463,422 A | 10/1995 | Simpson et al. |
| 6,297,805 B1 | 10/2001 | Adler et al. |
| 6,453,155 B1 | 9/2002 | Hill et al. |
| 6,643,124 B1 | 11/2003 | Wilk |
| 6,734,305 B2 | 5/2004 | Pierre et al. |
| 6,865,010 B2 | 3/2005 | Duthaler et al. |
| 7,030,855 B2 | 4/2006 | Metcalf |
| 7,034,802 B1 | 4/2006 | Gettemy et al. |
| 7,095,387 B2 | 8/2006 | Lee et al. |
| 2002/0000970 A1 | 1/2002 | Akimoto et al. |
| 2003/0048256 A1 | 3/2003 | Salmon |
| 2003/0071832 A1 | 4/2003 | Branson |
| 2003/0098857 A1 | 5/2003 | Gettemy et al. |
| 2003/0109286 A1 | 6/2003 | Hack et al. |
| 2003/0160735 A1 | 8/2003 | Lee et al. |
| 2004/0189709 A1 | 9/2004 | Halstead, Jr. |
| 2004/0218127 A1 | 11/2004 | Miura |
| 2006/0107566 A1 | 5/2006 | Van Rens |
| 2006/0133047 A1 | 6/2006 | Tomizuka et al. |
| 2006/0209246 A1 | 9/2006 | Kim |
| 2007/0097108 A1 | 5/2007 | Brewer |
| 2008/0224948 A1 | 9/2008 | Alberth |
| 2008/0224951 A1 | 9/2008 | Alberth |

FOREIGN PATENT DOCUMENTS

| | | |
|---|---|---|
| EP | 0899651 A2 | 3/1999 |
| EP | 1724742 A1 | 11/2006 |
| WO | 02057843 A2 | 7/2002 |
| WO | 2004053818 A1 | 6/2004 |

OTHER PUBLICATIONS

Dr. Mike Cooke; http:www/fabtech.org/content/view/2327; Jan. 5, 2007; 3 pages.
John Blau, IDG News Service; http://www.bio-itworld.com/newsitems/s005/01/011305_report7142.html.news: Apr. 30, 2006, 3 pages.

(Continued)

*Primary Examiner* — Abbas Abdulselam

(57) ABSTRACT

An apparatus (100) including a pixel diffuser for a stretchable display is disclosed. The apparatus may include an elastic viewable display (110) that is stretched in a first viewable display area configuration and contracted in a second viewable display area configuration. The apparatus can also include a plurality of addressable picture elements (120 and 125) disposed on the elastic viewable display, an optical barrier (132) between each of the plurality of addressable picture elements, and an elastic diffuser (140) optically coupled to the plurality of addressable picture elements on the elastic viewable display. The apparatus can also include an electrical interface (150) coupled to the elastic viewable display.

20 Claims, 2 Drawing Sheets

OTHER PUBLICATIONS

Patent Cooperation Treaty, "PCT Search Report and Written Opinion of the International Searching Authority" for International Application No. PCT/US2008/051547 Jun. 12, 2008, 13 pages.

USPTO, "Non-Final Rejection" U.S. Appl. No. 11/687,229 Dec. 28, 2009, 25 pages.

"Response to Non-Final Rejection" U.S. Appl. No. 11/687,229 Apr. 19, 2010, 14 pages.

USPTO, "Final Rejection" U.S. Appl. No. 11/687,229 Jul. 8, 2010, 19 pages.

USPTO, "Non-Final Rejection" U.S. Appl. No. 11/687,314 Jul. 22, 2010, 22 pages.

USPTO, "Non-Final Rejection" U.S. Appl. No. 11/687,314 Apr. 4, 2011, pp. 1-26.

"Response to Non-Final Rejection", U.S. Appl. No. 11/687,314, May 31, 2011, pp. 1-10.

LIGHT DIFFUSER FOR A STRETCHABLE DISPLAY

BACKGROUND

1. Field

The present disclosure is directed to displays. More particularly, the present disclosure is directed to an apparatus including a light diffuser for a visual interface having configurable viewing areas suitable for use in portable electronics devices.

2. Introduction

Presently, portable electronic devices including cellular telephone handsets, personal digital assistants (PDAs), handheld gaming devices, and laptop computers, among other devices, have become increasingly popular, particularly in mobile societies. Consumer demand for portability however is often at odds with a competing desire for large display interfaces, since small devices severely constrain the size of the display that may be incorporated into such devices. For example, a user may desire to have a large display, but a large display decreases the portability of such devices.

Some have endeavored to address competing demands for small form-factors and large display areas. For example, U.S. Pat. No. 7,095,387 entitled "Display Expansion Method and Apparatus" discloses an expandable display having multiple folding sections in a handheld computing device, wherein the display is expandable upon unfolding the multiple display sections. Another embodiment includes a retractable e-paper display screen that is supported by a folding panel that may be expanded. The '387 Patent also teaches reformatting displayed image based on the configuration of the display to maintain a constant display resolution regardless of the configuration of the display.

As an alternative to a foldable display and an e-paper display, a stretchable display could provide both for portability and for a large display. For example, a user could expand the display to increase the viewing size and could contract the display for portability. Unfortunately, a stretchable display may have a drawback in that as the display is stretched, gaps between picture elements may become more apparent, thus creating a screen door-type image. Thus, when the space between picture elements is increased, the image quality degrades as the display is stretched. This increases the ease of viewing the gaps and associated elements in the gaps between pixels and increases the screen door effect.

Thus, there is a need for an apparatus including a light diffuser for a stretchable display that spreads light throughout an entire pixel area regardless as to whether the display has been stretched or not and associated elements in the gaps between pixels in the stretchable display.

SUMMARY

An apparatus including a pixel diffuser for a stretchable display is disclosed. The apparatus may include an elastic viewable display that is stretched in a first viewable display area configuration and contracted in a second viewable display area configuration. The apparatus can also include a plurality of addressable picture elements disposed on the elastic viewable display, an optical barrier between each of the plurality of addressable picture elements, and an elastic diffuser optically coupled to the plurality of addressable picture elements on the elastic viewable display. The apparatus can also include an electrical interface coupled to the elastic viewable display. The apparatus can change the perceived size of the pixels as the elastic viewable display stretches and can decrease the ease of viewing gaps and associated elements in the gaps between pixels in the stretchable display.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
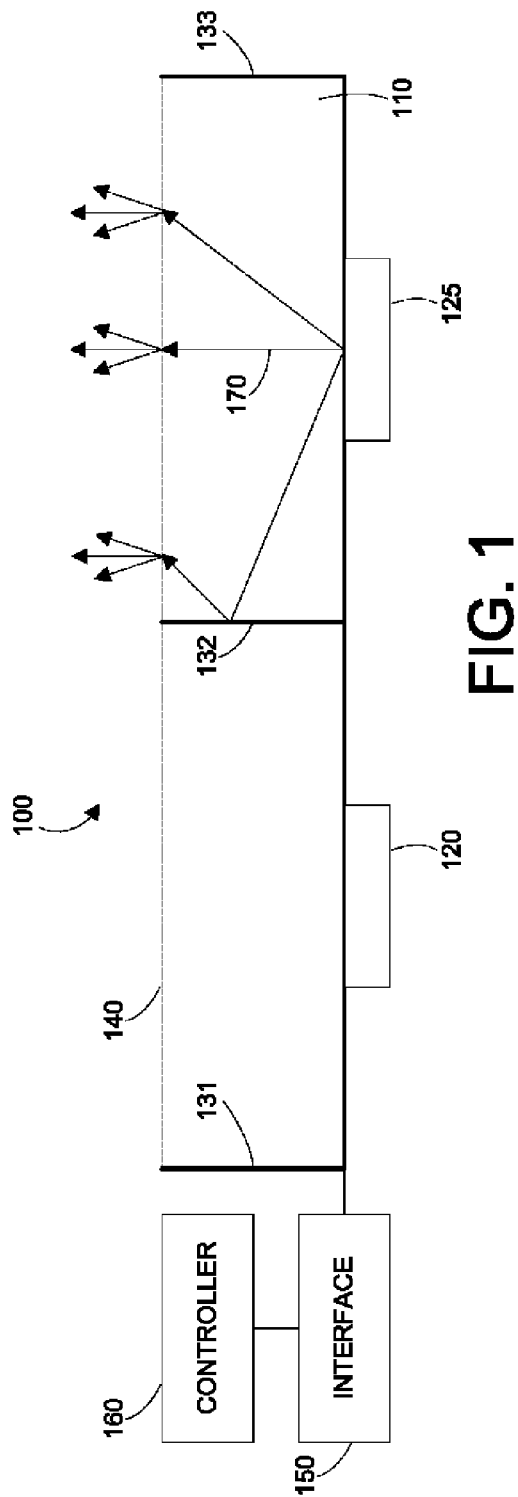
FIG. 1 is an exemplary illustration of an apparatus according to one embodiment.

FIG. 1 is an exemplary illustration of an apparatus 100 stretched in a first viewable display area configuration according to one embodiment. The apparatus 100 can include an elastic viewable display 110 including a substrate that can be stretched in a first viewable display area configuration, as shown, and contracted in a second viewable display area configuration. The apparatus 100 can also include a plurality of addressable picture elements 120 and 125 disposed on the elastic viewable display 110, optical barriers 131-133 between each of the plurality of addressable picture elements 120 and 125, an elastic diffuser 140 optically coupled to the plurality of addressable picture elements 120 and 125, and an electrical interface 150 coupled to the elastic viewable display 110. The elastic viewable display 110 can provide textual and graphical information. The elastic viewable display 110 can also be a combined display and user input interface. The elastic viewable display 110 can be suitable for a portable electronic device along with non-portable applications.

The elastic diffuser 140 can be a diffuser with Lambertian characteristics. For example, the elastic diffuser 140 can include random microstructures. The elastic diffuser 140 can also include multiple layers of particles. The elastic diffuser 140 can help provide uniform light from the elastic viewable display 110. Also, the elastic diffuser 140 can be made of the same material as a substrate of the elastic viewable display 110, may be in a different layer from the substrate, or may even replace the substrate.

The plurality of addressable picture elements 120 and 125 can be coupled to a substrate of the viewable display 110, can be inside the substrate, or can be adjacent to the substrate. The picture elements 120 and 125 may be embodied as light emitting diodes (LEDs) disposed on viewable display 110. For example, the LEDs may be fastened to a viewable display substrate using a conductive adhesive, by soldering, or by other suitable means. Alternatively, the LEDs may be formed integrally with or on the substrate using printing and/or lithography techniques. Integral implementations of the substrate and the picture elements may be embodied as plastic semiconductors. The picture elements 120 and 125 could also be implemented with transistors, shutters, or mirrors disposed on an elastic substrate. For example, the picture elements 120 and 125 could be clusters or islands of LCD pixels arranged on an elastic substrate. The picture elements 120 and 125 may also be located on troughs and/or ridges of pleated material, or therebetween. One or more picture elements may be located on each picture element. The picture elements 120 and 125 could be coupled to elastic conductors using conductive glue or solder or they could be printed on at least some of the exemplary substrate materials.

The picture elements 120 and 125 may be electrically interconnected, for example, to the interface 150 or other components by elastic conductors. The elastic conductor may comprise a conductive core and an insulating sheath. The core could be a silver impregnated rubber or some other elastic material with a conductive doping or conductive properties. The insulating sheath could be any compatible elastic material with suitable insulating properties. The elastic conductor can be integrated with the substrate, for example, by weaving it into an elastic fabric or integrating the elastic conductor with a discrete substrate component. The substrate can also be woven or otherwise created from elastic strands, at least some of which are conductors, thus forming a stretchable sheet of substrate or an elastic fabric as discussed above. In embodiments where the substrate and the picture elements are integrally formed of an elastic semiconductor, the leads could also be printed using lithographic techniques.

While the illustrated viewable display 110 includes only two picture elements 120 and 125, the viewable display 110 could also comprise a relatively large number of such elements. Also, while each picture element 120 and 125 can comprise at least one constituent element, individual picture elements may be aggregated to define a composite picture element. In other words, a picture element comprising a plurality of constituent picture elements. For example, three picture elements may be aggregated to form a Red, Blue & Green (RGB) color picture element. In other embodiments, a White (W) picture element may be added to form an RGBW picture element. Thus three or four individual picture elements may constitute a single color picture element. It is also possible for neighboring color picture elements to share individual elements. The picture elements 120 and 125 may be discrete components disposed on the substrate or the picture elements 120 and 125 may be an integral part of the substrate.

An elastic component of the elastic viewable display 110 can be the substrate per se. Exemplary elastic materials suitable for forming an elastic substrate can include elastic polymers among other natural and synthetic material having elastic properties. The elastic substrate may also be embodied as an elastic fabric capable of being stretched and contracted to increase and decrease the size and/or shape of the substrate. In these implementations, the elastic substrate can expand and contract parallel to a surface dimension of the elastic viewable display 110. In this implementation, the substrate may also be considered to lie within the surface of the viewable display 110. In some implementations, the height or vertical dimension of the elastic substrate may have a tendency to decrease as the substrate is stretched. The substrate can also be three dimensional which can stretch in three dimensions. The substrate may also comprise a structure formed of overlapping elements interconnected by an elastic component. The substrate structure may also comprise interleaved or overlapping shingle-like elements interconnected by elastic strands.

The optical barriers 131-133 can be reflective, can be absorbent, can be semi-absorbent, and/or can be stretchable barriers and can act as blinders for the picture elements 120 and 125. For example, the optical barriers 131 and 133 can be located in a stretchable film or substrate that is part of the viewable display 110.

In operation, the picture elements 120 and 125 can emit light 170 generally towards the diffuser 140. The light 170 may reflect off of one or more optical barrier 132 or may be absorbed by an optical barrier 132. Accordingly, the optical barrier 312 can substantially prevent crosstalk between the addressable picture elements 120 and 125. The light 170 can then pass through the diffuser 140 which can help provide uniform light exiting the viewable display 110.

The apparatus 100 can also include a controller 160 coupled to each of the plurality of addressable picture elements 120 and 125. The controller 160 can increase a brightness of the plurality of addressable picture elements 120 and 125 when the elastic viewable display 110 is in the first viewable display area configuration and decrease a brightness of the plurality of addressable picture elements 120 and 125 when the elastic viewable display 110 is in the second viewable display area configuration. A distance between the plurality of addressable picture elements 120 and 125 can increase in size when the elastic viewable display 110 is in the first viewable display area configuration and decrease in size when the elastic viewable display 110 is in the second viewable display area configuration.

The elastic viewable display 110 can have a surface dimension and the elastic viewable display 110 can expand and contract predominately in a direction substantially parallel to the surface dimension of the viewable display area. A density of the plurality of addressable picture elements 120 and 125 on the viewable display area 110 can be different in the first viewable display area configuration from a density of the plurality of addressable picture elements 120 and 125 in the second viewable display area configuration. The elastic diffuser 140 can be stretched with the elastic viewable display 110 in the first viewable display area configuration and contracted with the elastic viewable display 110 in the second viewable display area configuration. The elastic diffuser 140 can be stretched with the elastic viewable display 110 in the first viewable display area configuration to increase a perceived size of each of the plurality of addressable picture elements 120 and 125. The elastic viewable display 110 may include a substrate forming a viewable display area where the substrate can have an elastic component. The substrate may include multiple layers, such as a layer providing a gap, a layer including the diffuser, and a protective layer on top of the diffuser. The thickness of the layers can be comparable to the pixel periodicity. For example, the thickness can be greater than $\frac{1}{100}$ of the pixel periodicity.

According to a related embodiment, the apparatus 100 can include a viewable display 110 that is stretched in a first viewable display area configuration and contracted in a second viewable display area configuration, a plurality of addressable picture elements 120 and 125 disposed on the viewable display, an optical barrier 132 between each of the plurality of addressable picture elements 120 and 125, a diffuser 140 optically coupled to the plurality of addressable picture elements 120 and 125, and an electrical interface 160 coupled to the viewable display 110. The optical barrier 132 can substantially prevent crosstalk between each of the plurality of addressable picture elements 120 and 125. The apparatus 100 can also include a controller 160 coupled to each of the plurality of addressable picture elements 120 and 125. The controller can increase a brightness of the plurality of addressable picture elements 120 and 125 when the viewable display 110 is in the first viewable display area configuration and decrease a brightness of the plurality of addressable picture 120 and 125 elements when the viewable display 110 is in the second viewable display area configuration.

The viewable display 110 can have a surface dimension and the viewable display 110 can expand and contract predominately in a direction substantially parallel to the surface dimension of the viewable display area 110. The diffuser 140 can be stretched with the viewable display 110 in the first viewable display area configuration to increase a perceived size of each of the plurality of addressable picture elements 120 and 125. The optical barrier 132 can have a reflective characteristic and/or an absorbent characteristic.

According to another related embodiment, the apparatus 100 can include a viewable display 110 that is stretched in a first viewable display area configuration and contracted in a second viewable display area configuration. The viewable display 110 can have a surface dimension and the viewable display 110 can expand in the first viewable display area configuration and contract in the second viewable display area configuration predominately in a direction substantially parallel to the surface dimension. The apparatus 100 can also include a plurality of addressable picture elements 120 and 125 disposed on the viewable display where the plurality of addressable picture elements 120 and 125 can emit light 170. The apparatus 100 can additionally include an optical barrier 132 between each of the plurality of addressable picture elements 120 and 125. The optical barrier 132 can substantially prevent crosstalk of light 170 between each of the plurality of addressable picture elements 120 and 125. The apparatus 100 can further include a diffuser 140 optically coupled to the plurality of addressable picture elements 120 and 125. The diffuser configured to diffuse light 170 emitted from the plurality of addressable picture elements 120 and 125. The apparatus can also include an electrical interface 150 coupled to the plurality of addressable picture elements 120 and 125. The apparatus 100 can additionally include a controller 160 coupled to the plurality of addressable picture elements 120 and 125. The controller 160 can increase a brightness of light 170 emitted from the plurality of addressable picture elements 120 and 125 when the viewable display 110 is in the first viewable display area configuration and decrease a brightness of light 170 emitted from the plurality of addressable picture elements 120 and 125 when the viewable display 110 is in the second viewable display area configuration. For example, increasing the brightness can help compensate for the light being produced by the LED being spread across a greater pixel area to maintain constant perceived brightness of the picture elements 120 and 125 when the viewable display 110 is stretched.

Thus, a stretchable diffuser can be placed over pixels in a stretchable display. The diffuser can stretch with the display pixel substrate and thus increase and decrease the user perceived size of the pixels as the display module is stretched and shrunk. A stretchable light barrier film with same pitch as the display pixel can be placed before the diffuser to prevent cross talk between pixels. Such a film may also double as the base substrate for the diffuser.

Figure 2:
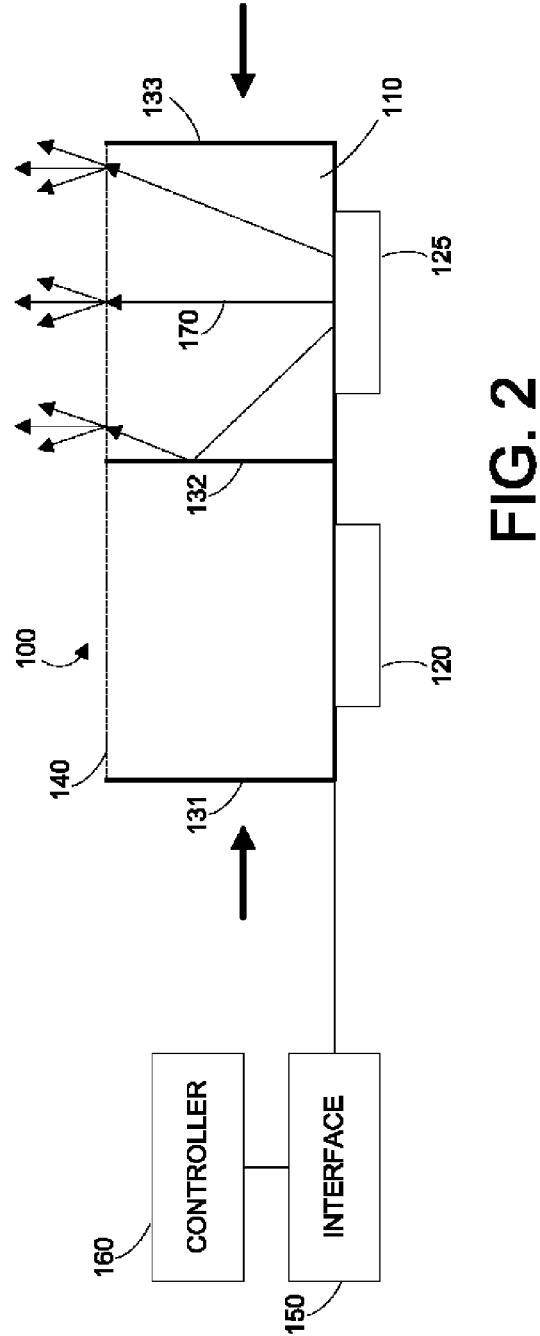
FIG. 2 is an exemplary illustration of an apparatus according to another embodiment.

FIG. 2 is an exemplary illustration of the apparatus 100 according to another embodiment. While certain aspects of size are directly relative to FIG. 1, the apparatus 100 is not necessarily drawn to scale. As shown, the viewable display 110 can be contracted in a second viewable display area configuration. In the second viewable display area configuration, the plurality of addressable picture elements 120 and 125 can be closer to each other and thus, may have a higher density than when the viewable display 110 is stretched in the first viewable display area configuration. Even though gaps between the addressable picture elements 120 and 125 may be different depending on display configuration, the perceived relative size of the addressable picture elements 120 and 125 can be maintained with respect to the size of the display due to use of the diffuser 140, brightness adjustments by the controller 160, and/or use of the barriers 131-133.

Figure 3:
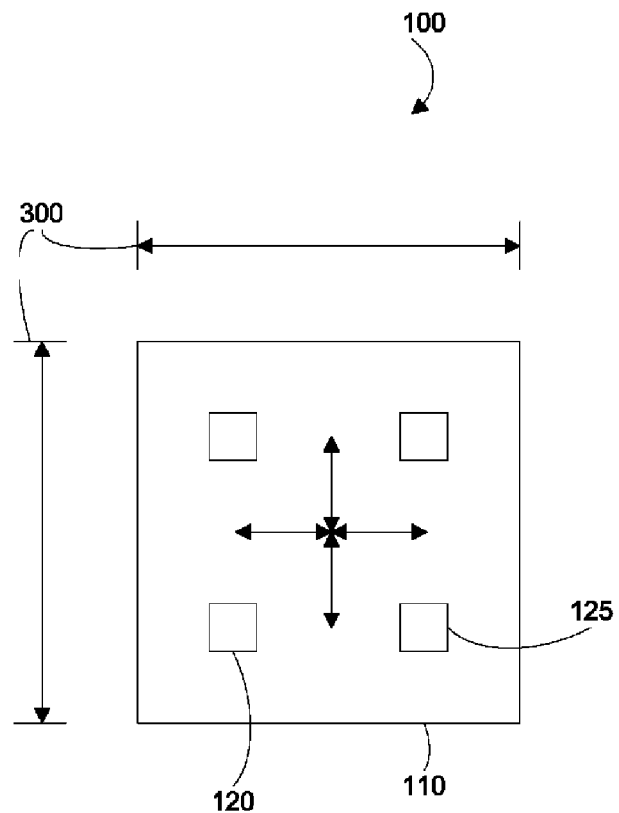
FIG. 3 is an exemplary illustration of a surface of an apparatus according to another embodiment.

FIG. 3 is an exemplary illustration of a surface of the apparatus 100, according to another embodiment. As shown, the viewable display 110 can have a surface dimension 300. The plurality of addressable picture elements 120, 125, etc. can be disposed in an array on a side of the viewable display across the surface dimension 300. The viewable display 110 can expand and contract predominately in a direction substantially parallel to the surface dimension 300 of the viewable display 110.

The surface dimension 300 of the viewable display 110 can be planar. The surface dimension 300 of the viewable display 110 may also be curved, such as concave or convex. According to one aspect of the disclosure, the size and/or shape of the viewable display 110 can be configurable. Thus, first and second viewable display area configurations of the viewable display 110 can have different size viewable display areas. Also, the first and second viewable display area configurations can have different shapes with the same size area. The size and/or shape of the viewable display 110 may be configured by an application or by the user. Also, the configuration of the viewable display 110 may be changed without changing its size. For example, the viewable display 110 could be configured between landscape and portrait configurations, wherein both configurations have the same amount of viewable display area.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus comprising:
   an elastic viewable display that is stretched in a first viewable display area configuration and contracted in a second viewable display area configuration;
   a plurality of addressable picture elements disposed on the elastic viewable display;

an optical barrier between each of the plurality of addressable picture elements;

an elastic diffuser optically coupled to the plurality of addressable picture elements on the elastic viewable display; and an electrical interface coupled to the elastic viewable display.

2. The apparatus according to claim 1, wherein the optical barrier substantially prevents crosstalk between each of the plurality of addressable picture elements.

3. The apparatus according to claim 1, further comprising a controller coupled to each of the plurality of addressable picture elements, the controller configured to increase a brightness of the plurality of addressable picture elements when the elastic viewable display is in the first viewable display area configuration and decrease a brightness of the plurality of addressable picture elements when the elastic viewable display is in the second viewable display area configuration.

4. The apparatus according to claim 1, wherein a distance between the plurality of addressable picture elements increases in size when the elastic viewable display is in the first viewable display area configuration and decreases in size when the elastic viewable display is in the second viewable display area configuration.

5. The apparatus according to claim 1, wherein the elastic viewable display has a surface dimension, and the elastic viewable display expands and contracts predominately in a direction substantially parallel to the surface dimension of the viewable display.

6. The apparatus according to claim 1, wherein a density of the plurality of addressable picture elements on the elastic viewable display area is different in the first viewable display area configuration and the second viewable display area configuration.

7. The apparatus according to claim 1, wherein the elastic diffuser is stretched with the elastic viewable display in the first viewable display area configuration and contracted with the elastic viewable display in the second viewable display area configuration.

8. The apparatus according to claim 1, wherein the elastic diffuser is stretched with the elastic viewable display in the first viewable display area configuration to increase a perceived size of each of the plurality of addressable picture elements.

9. The apparatus according to claim 1, wherein the elastic viewable display includes a substrate forming a viewable display area, the substrate having an elastic component.

10. The apparatus according to claim 1, wherein the optical barrier is reflective.

11. The apparatus according to claim 1, wherein the optical barrier is absorbent.

12. The apparatus according to claim 1, wherein optical barrier is a stretchable barrier.

13. The apparatus according to claim 1, wherein the elastic diffuser comprises a diffuser with Lambertian characteristics.

14. An apparatus comprising:
a viewable display that is stretched in a first viewable display area configuration and contracted in a second viewable display area configuration;

a plurality of addressable picture elements disposed on the viewable display;

an optical barrier between each of the plurality of addressable picture elements, the optical barrier substantially preventing crosstalk between each of the plurality of addressable picture elements;

a diffuser optically coupled to the plurality of addressable picture elements; and an electrical interface coupled to the viewable display.

15. The apparatus according to claim 14, further comprising a controller coupled to each of the plurality of addressable picture elements, the controller configured to increase a brightness of the plurality of addressable picture elements when the viewable display is in the first viewable display area configuration and decrease a brightness of the plurality of addressable picture elements when the viewable display is in the second viewable display area configuration.

16. The apparatus according to claim 14, wherein the viewable display has a surface dimension, and the viewable display expands and contracts predominately in a direction substantially parallel to the surface dimension of the viewable display.

17. The apparatus according to claim 14, wherein the diffuser is stretched with the viewable display in the first viewable display area configuration to increase a perceived size of each of the plurality of addressable picture elements.

18. The apparatus according to claim 14, wherein the optical barrier has at least one of a reflective characteristic and an absorbent characteristic.

19. An apparatus comprising:
a viewable display that is stretched in a first viewable display area configuration and contracted in a second viewable display area configuration, the viewable display having a surface dimension and the viewable display expands in the first viewable display area configuration and contracts in the second viewable display area configuration predominately in a direction substantially parallel to the surface dimension;

a plurality of addressable picture elements disposed on the viewable display, the plurality of addressable picture elements configured to emit light;

an optical barrier between each of the plurality of addressable picture elements, the optical barrier substantially preventing crosstalk of light between each of the plurality of addressable picture elements;

a diffuser optically coupled to the plurality of addressable picture elements, the diffuser configured to diffuse light emitted from the plurality of addressable picture elements; and an electrical interface coupled to the plurality of addressable picture elements.

20. The apparatus according to claim 19, further comprising a controller coupled to the plurality of addressable picture elements, the controller configured to increase a brightness of light emitted from the plurality of addressable picture elements when the viewable display is in the first viewable display area configuration and decrease a brightness of light emitted from the plurality of addressable picture elements when the viewable display is in the second viewable display area configuration.

* * * * *